(12) United States Patent
Venolia

(10) Patent No.: US 7,873,903 B2
(45) Date of Patent: Jan. 18, 2011

(54) METHOD FOR ENTERING TEXT

(75) Inventor: Gina Danielle Venolia, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 787 days.

(21) Appl. No.: 11/621,003

(22) Filed: Jan. 8, 2007

(65) Prior Publication Data

US 2007/0143675 A1 Jun. 21, 2007

Related U.S. Application Data

(62) Division of application No. 09/822,564, filed on Mar. 30, 2001, now Pat. No. 7,162,694.

(60) Provisional application No. 60/268,356, filed on Feb. 13, 2001.

(51) Int. Cl.
*G06F 17/00* (2006.01)
(52) U.S. Cl. .................. 715/271; 715/256; 715/259
(58) Field of Classification Search .............. 715/255, 715/256, 271, 230, 261, 259, 260; 341/22, 341/168
See application file for complete search history.

(56) References Cited

U.S. PATENT DOCUMENTS

| | | | | |
|---|---|---|---|---|
| 3,648,271 A | * | 3/1972 | McConnell et al. | 345/23 |
| 3,676,856 A | * | 7/1972 | Manly | 715/209 |
| 4,138,719 A | * | 2/1979 | Swanstrom et al. | 358/1.18 |
| 4,177,448 A | * | 12/1979 | Brayton | 382/160 |
| 4,460,973 A | * | 7/1984 | Tanimoto et al. | 704/6 |
| 5,627,980 A | | 5/1997 | Schilit et al. | 395/353 |
| 5,797,098 A | * | 8/1998 | Schroeder et al. | 455/464 |
| 5,818,437 A | | 10/1998 | Grover et al. | 345/326 |
| 5,953,541 A | | 9/1999 | King et al. | 395/887 |
| 6,002,390 A | | 12/1999 | Masui | 345/173 |
| 6,005,495 A | * | 12/1999 | Connolly et al. | 341/22 |
| 6,011,542 A | | 1/2000 | Durrani et al. | 345/156 |
| 6,011,544 A | | 1/2000 | Sato | 345/168 |
| 6,025,931 A | | 2/2000 | Bloomfield | 358/402 |
| 6,169,538 B1 | | 1/2001 | Nowlan et al. | 345/168 |
| 6,271,835 B1 | | 8/2001 | Hoeksma | 345/168 |
| 6,567,072 B2 | | 5/2003 | Watanabe | 345/161 |
| 6,741,235 B1 | | 5/2004 | Goren | 345/173 |
| 6,782,357 B1 | | 8/2004 | Goodman et al. | 704/9 |
| 6,801,190 B1 | | 10/2004 | Robinson et al. | 345/173 |
| 2002/0126097 A1 | | 9/2002 | Savolainen | 345/168 |
| 2002/0188448 A1 | | 12/2002 | Goodman et al. | 704/254 |
| 2003/0011574 A1 | | 1/2003 | Goodman | 345/172 |
| 2003/0023420 A1 | | 1/2003 | Goodman | 704/1 |

OTHER PUBLICATIONS

Terveen, Loren, et al, "Constructing, Organizing, and Visualizing Collections of Topically Related Web Resources", Transactions on Computer-Human Interaction (TOCHI), vol. 6, Issue 1, Mar. 1999, pp. 67-94.*

(Continued)

*Primary Examiner*—Laurie Ries
(74) *Attorney, Agent, or Firm*—Steven M. Koehler; Westman, Champlin & Kelly, P.A.

(57) ABSTRACT

A method of providing selected text into a computer includes selecting a character in a range of characters and selecting a word as a function of the selected character. The word is presented to the user and an action is received from the user pertaining to the selected character.

18 Claims, 9 Drawing Sheets

230

| TAP | ACTION | DISPLAY |
|---|---|---|
| | INITIAL DISPLAY | SAID |
| 2 | PICK A LETTER [A, B, C] | COMPANY |
| RIGHT | MOVE CURSOR RIGHT | COMPANY |
| 2 | PICK A LETTER [A, B, C] | CAN |
| RIGHT | MOVE CURSOR RIGHT | CAN |
| 8 | PICK A LETTER [T, U, V] | CAUSE |
| UP | PICK T | CATHOLIC |
| RIGHT | MOVE CURSOR RIGHT | CATHOLIC |
| SPACE | NIP OFF PREDICTION | CAT_ |

OTHER PUBLICATIONS

K. Seymore et al., "Scalable Backoff Language Models", In Proc. ICSLP, vol. 1, pp. 232-235, Philadelphia, 1966.

Chen et al., "An Empirical Study of Smoothing Techniques for Language Modeling", TR-10-98, Computer Science Group, pp. 1-64, Harvard University, 1998.

Lehikoinen et al., "BinScroll: A Rapid Selection Technique for Alphanumeric Lists", CHI 2000, pp. 261-262, Apr. 1-6, 2000.

Silfverberg, Miika, et al, "Predicting Text Entry Speed on Mobile Phones", Proceedings of the SIGCHI Conference on Human Factors in Computing Systems, Apr. 2000, pp. 9-16.

F. Jelinek, "Self Organized Language Modeling for Speech Recognition", Language Processing for Speech Recognition, (1990), pp. 450-503.

Stolcke, "Entropy-based Pruning of Backoff Language Models", Proc. DRAPA News Transcription and Understanding Workshop, (1998), pp. 270-274, Lansdowne, VA.

Ahlberg et al., "The Alphaslider: A Compact and Rapid Selector", Proc. CHI 94, (1994), p. 365-371.

* cited by examiner

| TAP | ACTION | DISPLAY |
|---|---|---|
|  | INITIAL DISPLAY | SAID |
| UP | PICK A LETTER [A-S] | COMPANY |
| RIGHT | MOVE CURSOR RIGHT | COMPANY |
| UP | PICK A LETTER [A-O] | CHAIRMAN |
| UP | PICK A LETTER [A-H] | CAN |
| RIGHT | MOVE CURSOR RIGHT | CARE |
| DOWN | PICK A LETTER [R-Z] | CASH |
| DOWN | PICK A LETTER [S-Z] | CAUSED |
| UP | PICK A LETTER [S-U] | CATHOLIC |
| RIGHT | MOVE CURSOR RIGHT | CATHOLIC |
| SPACE | NIP OFF PREDICTION | CAT_ |

| TAP | ACTION | DISPLAY |
|---|---|---|
| | INITIAL DISPLAY | SAID |
| 2 | PICK A LETTER [A, B, C] | COMPANY |
| RIGHT | MOVE CURSOR RIGHT | COMPANY |
| 2 | PICK A LETTER [A, B, C] | CAN |
| RIGHT | MOVE CURSOR RIGHT | CAN |
| 8 | PICK A LETTER [T, U, V] | CAUSE |
| UP | PICK T | CATHOLIC |
| RIGHT | MOVE CURSOR RIGHT | CATHOLIC |
| SPACE | NIP OFF PREDICTION | CAT_ |

METHOD FOR ENTERING TEXT

CROSS-REFERENCE TO RELATED APPLICATION

The present application is a divisional of and claims the benefit of application Ser. No. 09/822,564, filed on Mar. 30, 2001 and is based on and claims the benefit of U.S. provisional patent application Ser. No. 60/268,356, filed Feb. 13, 2001, all of which are hereby incorporated by reference in their entirety.

BACKGROUND OF THE INVENTION

The present invention relates to entering text into a computing device. More particularly, the invention relates to entering text using a limited keyboard or other input device.

Small computing devices such as pagers, personal information managers (PIM) devices and portable phones are used with an ever increasing frequency by people in their day to day activities. With the increase power now available from microprocessors used to run these devices, the functionality of these devices are merging. For instance, many portable phones now can be used to access and browse the Internet as well as can be used to store personal information such as addresses, phone numbers and the like.

In view that these computing devices are being used for other functions, in many applications it is necessary to enter text into the computing devices. Unfortunately, due to the desire to keep these devices as small as possible in order that they are easily carried, a conventional keyboard having all the letters of the alphabet as isolated buttons is usually not possible due to the limited surface area available on the housing of the computing device.

There is thus an ongoing need to improve upon the methods used to input text into computing devices such as small, portable or mobile devices. In addition, the improved method may also be helpful in entering text into computers for those people having limited physical abilities.

SUMMARY OF THE INVENTION

A method of providing selected text into a computer includes selecting a character in a range of characters and selecting a word as a function of the selected character. The word is presented to the user and an action is received from the user pertaining to the selected character.

Typically, the foregoing method is iteratively repeated until the desired character in the desired word is obtained. Upon obtaining the first character of the desired word, the process is repeated for each remaining character of the word. Only a limited set of indications are necessary from the user to perform the method, thereby allowing this technique to be easily implemented on small computing devices as well as a general computer for the physical impaired.

A second aspect of the present invention includes a method of providing selected text into a computer that includes selecting a word as a function of a set of retained characters and presenting the word to the user. An action is received from the user pertaining to a character in the word following the set of characters. This method is also iteratively performed for each character until the desired word is obtained.

DETAILED DESCRIPTION OF THE PREFERRED EMBODIMENTS

Figure 1:
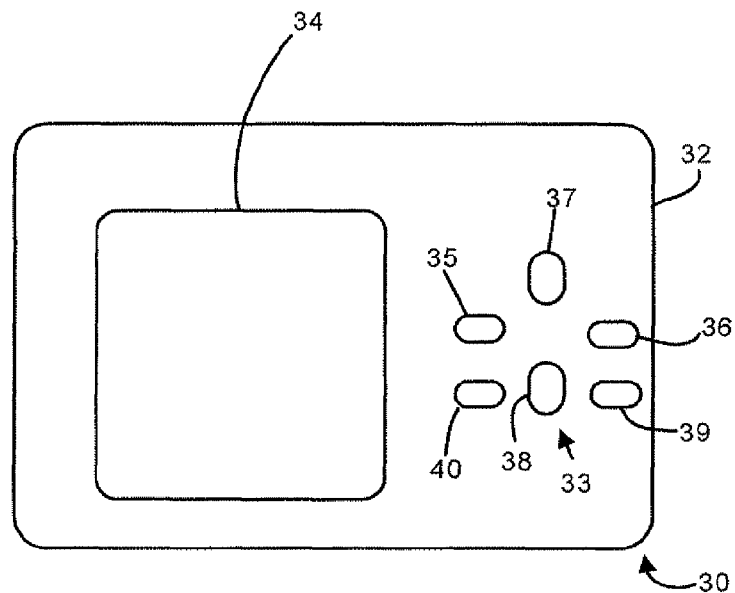
FIG. 1 is a plan view of a first embodiment of a computing device embodying the present invention.

An exemplary form of the present invention is embodied in a pager and/or data management device 30 illustrated in FIG. 1. However, it is contemplated that the present invention can also be practiced using other readily portable "mobile" electronic devices having limited surface areas for input buttons or the like. For example, a cellular phone and/or data management device employing the present invention would achieve virtually all of the benefits and advantages of the present invention. Such devices will have enhanced utility compared to existing portable personal information management (PIM) devices and other portable electronic devices, and the functions and compact size of such devices will more likely encourage the user to carry the device at all times. Accordingly, it is not intended that the scope of the present invention be limited by the disclosure of the invention as embodied in an exemplary pager, phone, PIM device or computer herein illustrated.

A top view of the pager and/or data management mobile device 30 is shown in FIG. 1. The mobile device 30 includes a housing 32 and has a user interface that includes a plurality of buttons 33 disposed on the top of the housing 32 and having six buttons that are used to control a display 34 and the functions performed in connection with its conventional paging function and/or its PIM data management functions. The buttons comprise a left button 35, a right button 36, an up button 37, and a down button 38, an accept button 39 and a space button 40. The buttons 33 allow the user to enter text in a method discussed below. The buttons 33 can also allow the user to navigate the user through a directory/menu hierarchy of the device 30; however, the details related to this function are not pertinent to the present invention.

Figure 2:
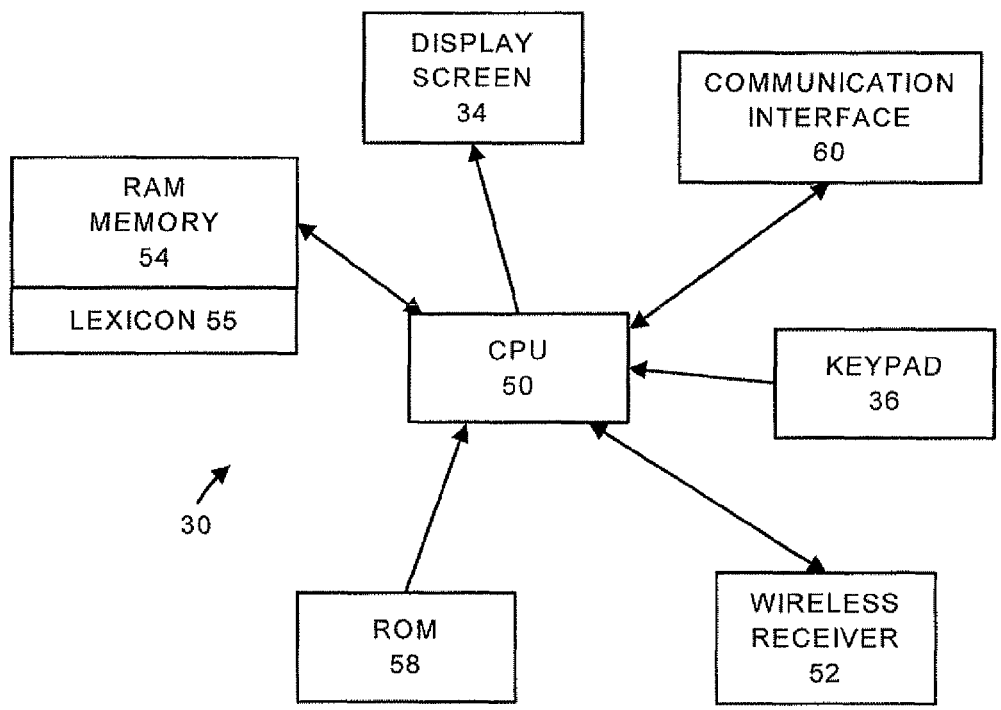
FIG. 2 is a block diagram of the computing device of FIG. 1.

Referring now to FIG. 2, a block diagram illustrates the functional components comprising the mobile device 30. An eight-bit central processing unit (CPU) 50 implements the software controlled functions, although it will be understood that CPUs employing either more or fewer bits can alternatively be employed. CPU 50 is coupled to display 34 so that text and graphic icons generated in accordance with the controlling software appear on the display 34. Data that are downloaded or entered by the user into the mobile device 30 are stored in a non-volatile read/write memory store 54, and this memory is bidirectionally coupled to the CPU 50, which reads and writes the data in a serial stream. The random access memory (RAM) 54 provides volatile storage for instructions that are executed by the CPU 50, and storage for temporary data, such as register values. Default values for configuration options and other variables are stored in a ROM 58. The ROM 58 is also used to store the operating system software for the device that controls the basic functionality of the mobile device 30, e.g., its conventional paging function and other operating system kernel functions, e.g., the loading of software components into RAM 54.

Memory 54 simply serves as storage for the code in a manner analogous to the function of a hard drive on a PC that is used to store application programs. It should be noted that although non-volatile memory is used for storing the code, it can alternatively be stored in a volatile memory that is not used for execution of the code. In FIG. 2, a lexicon 55 comprising a list of words and/or characters typically with associated probabilities is illustrated as forming part of RAM 54; however, the lexicon 55 could also be stored in ROM 58.

Paging signals can be received by the mobile device 30 and are handled through a wireless receiver 52, which is coupled to CPU 50. An optional communication interface 60 can also be provided for downloading data directly from a computer (e.g. desktop computer) if desired. The interface 60 can comprise a wireless interface, for example, RF, infrared or the like.

Figure 3:
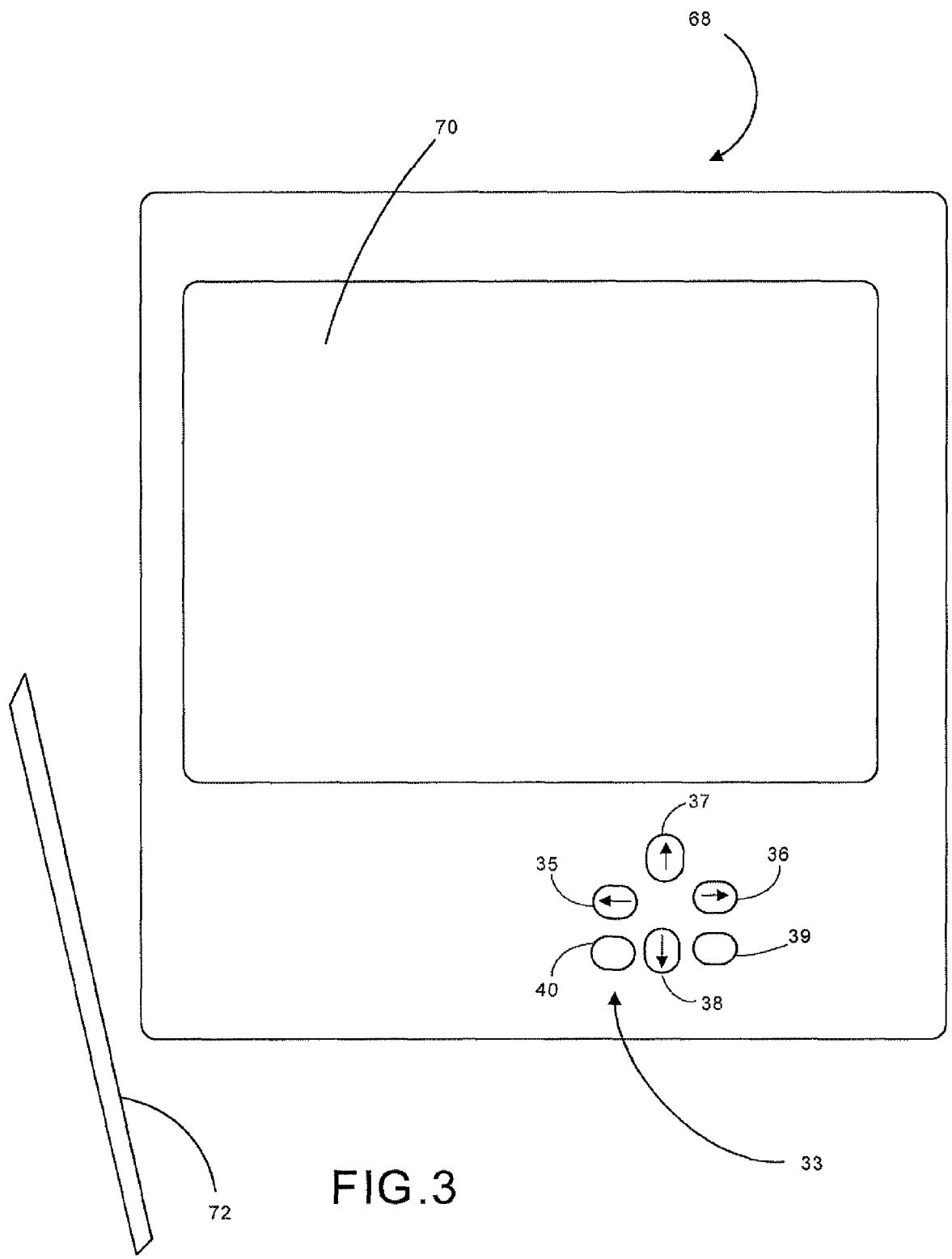
FIG. 3 is a simplified plan view of another computing device.
Figure 4:
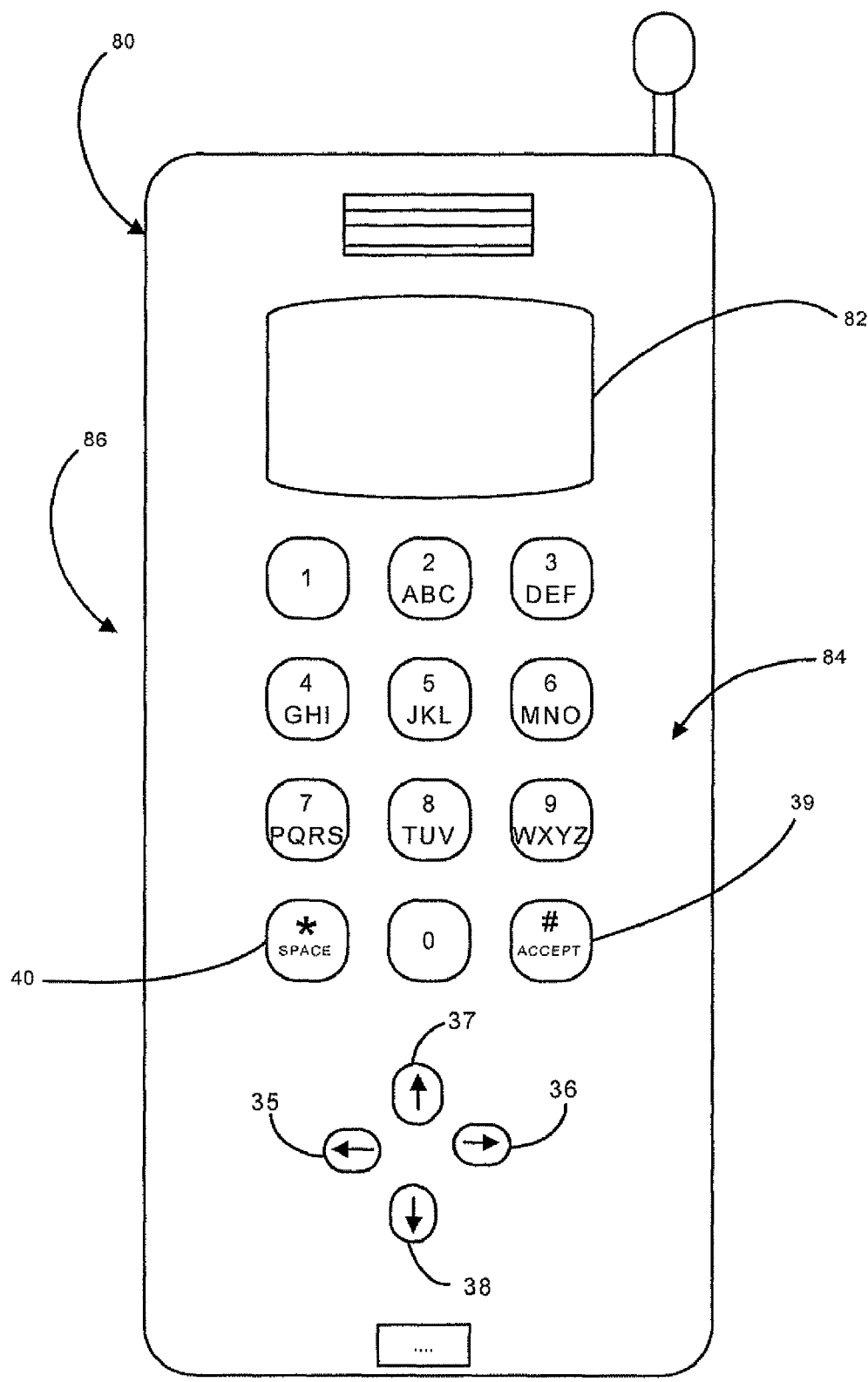
FIG. 4 is a plan view of a telephone.

FIG. 3 and FIG. 4 illustrate another handheld mobile device and phone, respectively, that can also incorporate and benefit from the present invention. Referring to FIG. 3, mobile device 68 includes a display 70 and stylus 72. Display 70 can be a liquid crystal display (LCD) which uses a contact sensitive display screen in conjunction with stylus 72. Stylus 72 is used to press or contact the display 70 at designated coordinates to accomplish the functions of buttons 33. Alternatively, or in addition, one or more of the buttons 33 can be included on the device 68, as illustrated.

FIG. 4 is a plan view of an exemplary embodiment of a portable phone 80. The phone 80 includes a display 82, a key pad 84 that includes the buttons 33 previously described as well as additional buttons 86, some of which have been assigned a subset of letters of the alphabet. The buttons 86 can be used in an alternative embodiment of the method for entering text as discussed below. Generally, the block diagram of FIG. 2 applies to the embodiments illustrated in FIGS. 3 and 4, although additional circuitry necessary to perform other functions of the mobile devices of FIGS. 3 and 4 may be required. For instance, a transceiver necessary to operate as a phone will be required for the embodiment of FIG. 4; however, such circuitry is not pertinent to the present invention.

In addition to the portable or mobile computing devices described above, it should also be understood that the present invention can be used with numerous other computing devices such as a general desktop computer. In particular, the present invention will allow a user with limited physical abilities to input or enter text into the computing device when other conventional input devices, such as a full alpha-numeric keyboard, are too difficult to operate. The following is a brief description of a general purpose computer 120. However, the computer 120 is again only one example of a suitable computing environment and is not intended to suggest any limitation as to the scope of use or functionality of the invention. Neither should the computer 120 be interpreted as having any dependency or requirement relating to any one or combination of components illustrated therein.

The invention is also operational with numerous other general purpose or special purpose computing systems, environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

Figure 5:
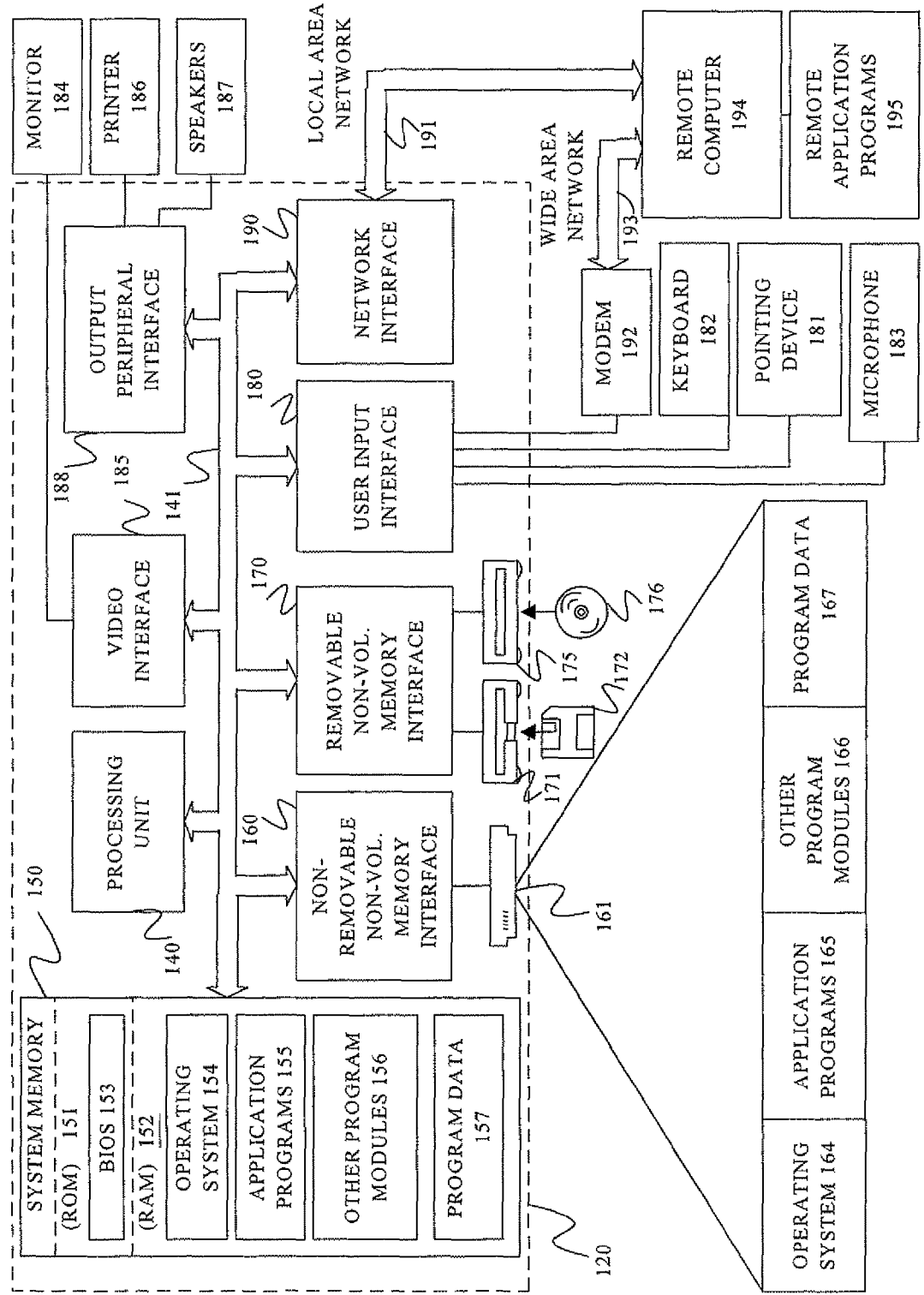
FIG. 5 is a block diagram of general purpose computer.

With reference to FIG. 5, components of computer 120 may include, but are not limited to, a processing unit 40, a system memory 150, and a system bus 141 that couples various system components including the system memory to the processing unit 140. The system bus 141 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 120 typically includes a variety of computer readable mediums. Computer readable mediums can be any available media that can be accessed by computer 120 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 150 includes computer storage media in the form of volatile and/or nonvolatile memory such as read only memory (ROM) 151 and random access memory (RAM) 152. A basic input/output system 153 (BIOS), containing the basic routines that help to transfer information between elements within computer 120, such as during start-up, is typically stored in ROM 151. RAM 152 typically contains data and/or program modules that are immediately accessible to and/or presently being operated on by processing unit 140. By way of example, and not limitation, FIG. 5 illustrates operating system 54, application programs 155, other program modules 156, and program data 157.

The computer 120 may also include other removable/non-removable volatile/nonvolatile computer storage media. By way of example only, FIG. 5 illustrates a hard disk drive 161 that reads from or writes to non-removable, nonvolatile magnetic media, a magnetic disk drive 171 that reads from or writes to a removable, nonvolatile magnetic disk 172, and an optical disk drive 175 that reads from or writes to a removable, nonvolatile optical disk 176 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 161 is typically connected to the system bus 141 through a non-removable memory interface such as interface 160, and magnetic disk drive 171 and optical disk drive 175 are typically connected to the system bus 141 by a removable memory interface, such as interface 170.

The drives and their associated computer storage media discussed above and illustrated in FIG. 5, provide storage of computer readable instructions, data structures, program modules and other data for the computer 120. In FIG. 5, for example, hard disk drive 161 is illustrated as storing operating system 164, application programs 165, other program modules 166, and program data 167. Note that these components can either be the same as or different from operating system 154, application programs 155, other program modules 156, and program data 157. Operating system 164, application programs 165, other program modules 166, and program data 167 are given different numbers here to illustrate that, at a minimum, they are different copies.

A user may enter commands and information into the computer 120 through input devices such as a keyboard 182, a microphone 183, and a pointing device 181, such as a mouse, trackball or touch pad. Other input devices (not shown) may include a joystick, game pad, satellite dish, scanner, or the like. These and other input devices are often connected to the processing unit 140 through a user input interface 180 that is coupled to the system bus, but may be connected by other interface and bus structures, such as a parallel port, game port or a universal serial bus (USB) A monitor 184 or other type of display device is also connected to the system bus 141 via an interface, such as a video interface 185. In addition to the monitor, computers may also include other peripheral output devices such as speakers 187 and printer 186, which may be connected through an output peripheral interface 188.

The computer 120 may operate in a networked environment using logical connections to one or more remote computers, such as a remote computer 194. The remote computer 194 may be a personal computer, a hand-held device, a server, a router, a network PC, a peer device or other common network node, and typically includes many or all of the elements described above relative to the computer 120. The logical connections depicted in FIG. 5 include a local area network (LAN) 191 and a wide area network (WAN) 193, but may also include other networks. Such networking environments are commonplace in offices, enterprise-wide computer networks, intranets and the Internet.

When used in a LAN networking environment, the computer 120 is connected to the LAN 191 through a network interface or adapter 190. When used in a WAN networking environment, the computer 120 typically includes a modem 192 or other means for establishing communications over the WAN 193, such as the Internet. The modem 192, which may be internal or external, may be connected to the system bus 141 via the user input interface 180, or other appropriate mechanism. In a networked environment, program modules depicted relative to the computer 120, or portions thereof, may be stored in the remote memory storage device. By way of example, and not limitation, FIG. 5 illustrates remote application programs 195 as residing on remote computer 194. It will be appreciated that the network connections shown are exemplary and other means of establishing a communications link between the computers may be used.

Figure 6:
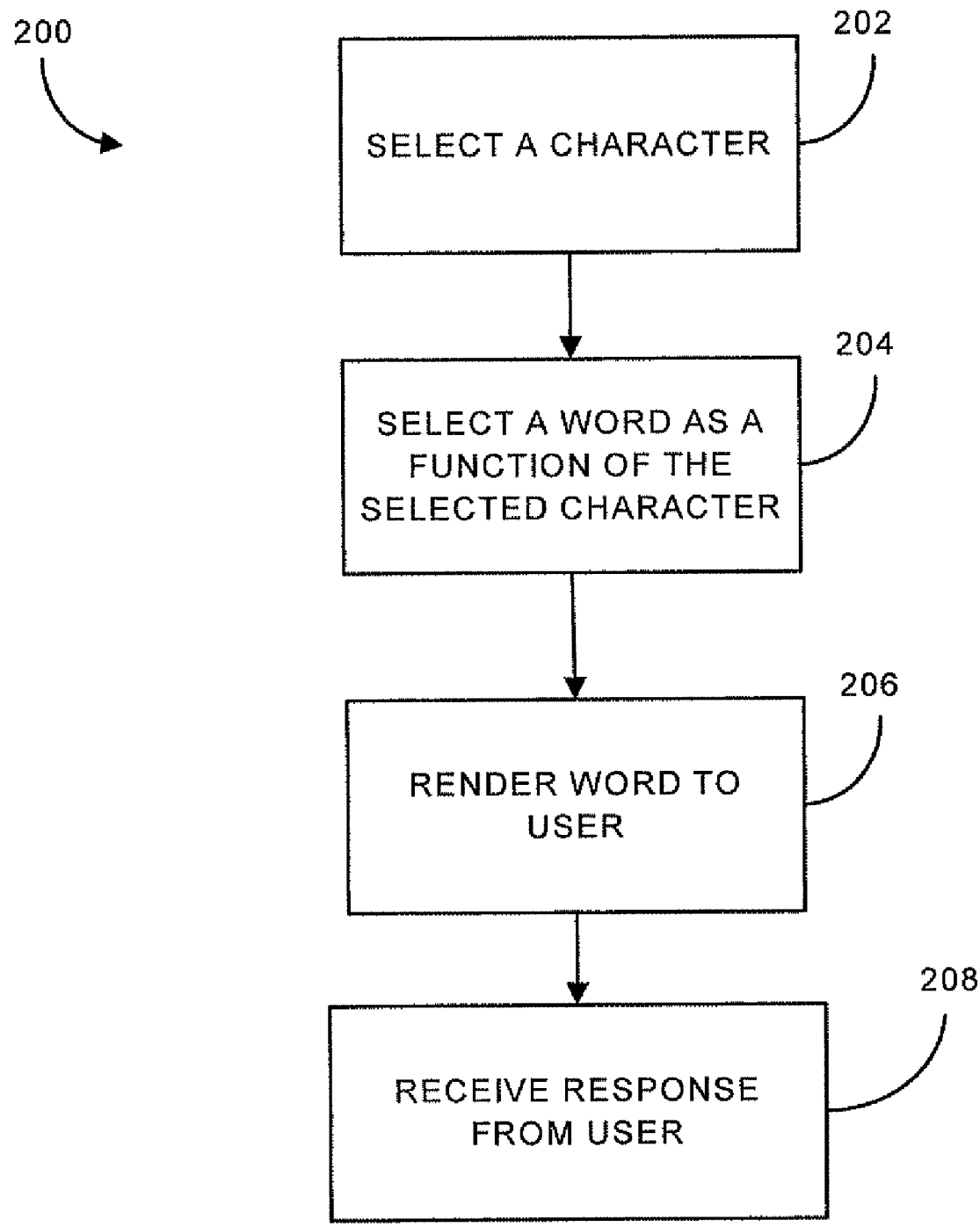
FIG. 6 is a flow chart illustrating a method of entering text.

FIG. 6 illustrates a method 200 for entering text into any of the electronic devices described above or similar electronic devices. The method 200 includes selecting a character in a range of characters at step 202. At step 204, a word is selected as a function of the selected character. At step 206, the word is rendered to the user using an output device of the electronic computing device such as a display, a printer, a speaker or the like. An action is received from the user pertaining to the selected character at step 208. Generally, the action can include accepting the character or indicating that the character is not the correct character.

Figure 7:
FIG. 7 is a chart illustrating an example of entering text.

A brief example should be helpful in illustrating method 202 of FIG. 6. Table 220 of FIG. 7 illustrates inputs in column 222, actions performed by the computing device in column 224 and words that are rendered by the computing device in column 226.

Initially, the computing device selects a character within the range "a" . . . "z". In the embodiment illustrated, the character selected is "s", which can be a function of probability from lexicon 55, for example, based on the number of words that begin with "s". Having selected a character, the computing device then selects from lexicon 55 a word based on the selected character in the example provided, the word selected is "said". The selected word is then displayed or otherwise rendered to the user. The computing device then awaits user feedback as provided at step 208 of FIG. 6.

The user uses an input device to provide feedback based upon the selected character and/or the selected word rendered by the computing device. Using the buttons 33 of FIG. 1 by way of example, the left button 35, the right button 36, the up button 37, the down button 38, the accept button 39 and the space button 40 can be actuated.

Generally, the up button 37 and down button 38 readjusts the range of characters to be used during the next iteration of method 200. In particular, the up button 37 indicates that a desired character is in a range alphabetically preceding the selected character (which is illustrated in column 226 as being underlined). In contrast, the down button 38 indicates that a desired character is in a range alphabetically succeeding the selected character. The computing device can then begin method 202 again from an initial state such as illustrated in FIG. 6.

The right button 36 is used to indicate that the selected character should be retained as one of a set of retained characters. If the selected character is not at the end of the word displayed, then the selected character is retained, and the next character in the word is chosen as the new selected character at step 202 and the word selected at step 204 remains unchanged. However, if the end of the currently displayed word has been reached, then the selected character is retained and the range of characters is set to "a" . . . "z", and a new selected character is chosen as discussed below. In a further embodiment, the selected character can also be selected as a function of the set of retained characters (i.e. the prefix so far stored) In one embodiment, the word selected at step 204 is chosen as the most likely word that starts with the set of retained characters followed by the new selected character. The display 34 is updated to reflect these changes. The computing device can then begin method 202 again from an initial state such as illustrated in FIG. 6.

The left button 35 indicates a character from the set of retained characters should be removed. Typically, the character that is removed is the last accepted character so far retained. Accordingly, if the character removed is not at the start of the word, then the right most character of the set of retained characters is deleted. The range of characters is then set to "a" ... "z". The new selected character at step 202 can be as a function of the characters still retained in the set of retained characters, while the selected word is chosen as the most likely word that starts with the set of retained characters followed by the new selected character. If, on the other hand, the cursor position is at the start of the word, then the word is removed from storage (assuming that there has been a succession of words that have been entered) and the previous word that was entered is displayed is The set of retained characters is then set to the word less its right most character, which becomes the new selected character at step 202 and the previous word is selected at step 204. However, if there are no previous words that have been entered, the computing device can select an initial character and word such as illustrated in FIG. 7. The computing device can then begin method 202 again from an initial state such as illustrated in FIG. 6.

The accept button 39 accepts the selected word of step 204 and stores the word for further processing. The computing device can then begin method 202 again from an initial state such as illustrated in FIG. 6.

The space button 40 accepts the set of retained characters as at least part of a word. In the exemplary embodiment of FIG. 6, the space button indicates that just the set of retained characters should comprise the word, wherein all other characters of the displayed word will be ignored. In another embodiment, the space button 40 can indicate that the set of retained characters and the selected character currently being displayed comprises the desired word.

From the foregoing, it should also be understood that the present invention is not limited to depression of buttons in order to provide user feedback. In other words, other input devices such as joysticks, rollerballs, pointing devices such as mice, can be used. In addition, simultaneous depression of individual buttons can be used to indicate some responses of the user.

Referring now in detail to chart 220 of FIG. 7, where "cat" is the desired word, the computing device initially displays "said" with "s" set off from the rest of the characters, such as highlighted, italicized, etc., herein underlined. Recognizing that the desired word "cat" is before "said", and more importantly, "c" is before "s", the user depresses the up button 37. The computing device then picks a new selected character from the range "a" ... "r". In this example, the selected character is "c" and the new selected word as a function of "c" is "company".

The user recognizes that "c" is correct and subsequently depresses the right button 36 to move the cursor to the right and thus "o" is underlined. Since "a" of "cat" is before "o", the user depresses the up button 37 and a new selected character "h" is chosen for the range of characters comprising "a" ... "n". The new selected word based on the set of retained characters ("c") and the new selected character "h" is "chairman", where the characters to the right of "h" in "chairman" are not under individual consideration until the cursor is moved to the right. (However, if the "chairman" was the correct word the user could depress the accept button 39.) The process continues as provided in chart 220 until all of the characters of "cat" have been selected, at which time the user presses the space button 40 to signify that the remaining letters of "catholic" not comprising the word "cat" should be ignored.

Figure 8:
FIG. 8 is a chart illustrating a second example of entering text.

In the example described above, the buttons comprised the set of buttons 33 illustrated in FIGS. 1 and 3. As appreciated by those skilled in the art, other limited keypads, such as a keypad 84 illustrated in FIG. 4, can benefit from the present invention. In keypad 84, the keys "2" ... "9" are associated with a subset of characters of the alphabet. This is a common configuration found in many telephone keypads. FIG. 8 illustrates in chart 230 how the keypad 84 can be used to select the same word "cati". Generally, the keys "2" ... "9" are used to select a set of characters for the desired word, while the buttons 33 are used in a manner described above to further refine the range of selected characters.

Figure 9:
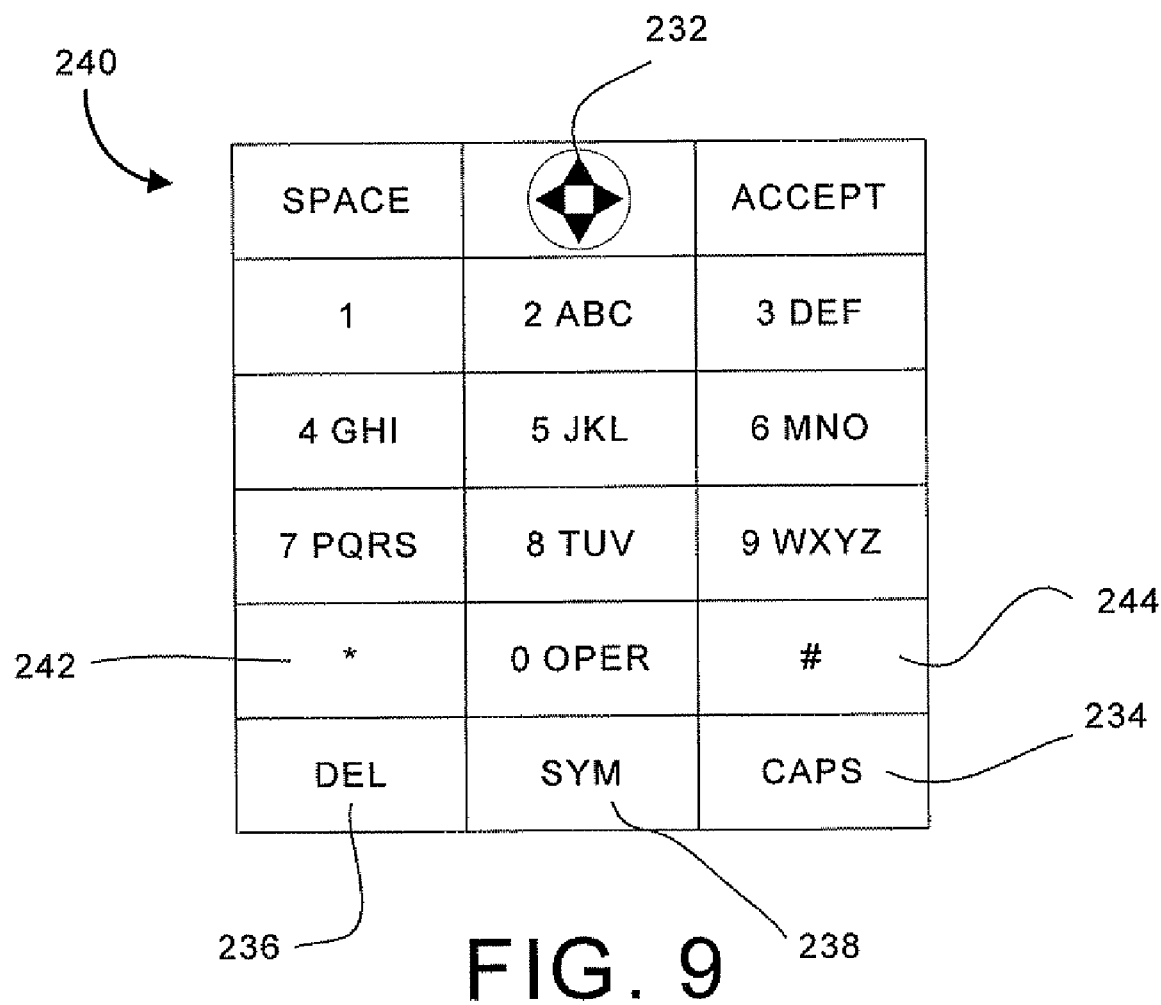
FIG. 9 is a plan view of an alternative keypad.

FIG. 9 illustrates yet another keypad 240 similar to the keypad 84 of FIG. 4, but incorporating a four-way button 232 that allows for "up", "down", "right" and "left" inputs. In this example, the keypad 240 also illustrates a "caps" button 234 that allows a character, for example, the character currently being underlined, to be selectively capitalized. Alternatively, the "caps" button 234 can change the selected word from lower case to upper case and vise versa. A "delete" button 236 is also provided to allow deletion of selected characters currently being displayed or rendered.

A "symbols" button 238 can also be depressed to indicate that a symbol should be entered. Generally, the symbols can be displayed sequentially where the up/down/left/right inputs are used to navigate and select the desired symbol. Alternatively, the symbols can be displayed in a grid to allow easy navigation and selection. Pressing the "accept" button 240 selects the current symbol that is underlined or otherwise highlighted, which is then entered into the stored text and the symbol grid is removed from the display. It should be noted the "*" button 242 and "#" button 244 can be used for other functions such as the "space" and "accept" functions, if desired.

Figure 10:
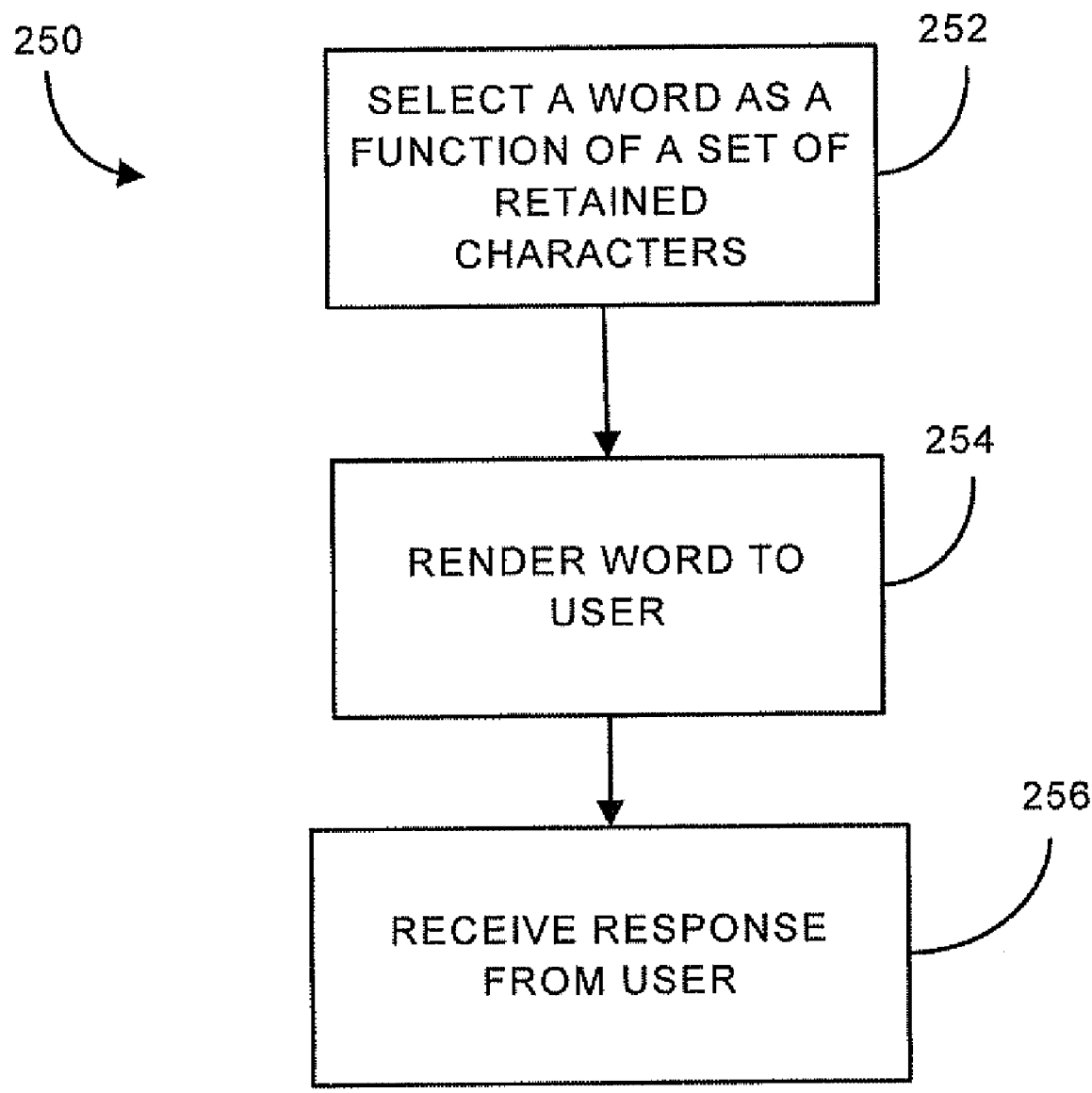
FIG. 10 is a flow chart illustrating a second method of entering text.

In the above description, a character is first selected, then a word is selected that starts with the set of retained characters, if any, and the selected character. Alternately, the best word with the set of retained characters directly can be selected from the lexicon 55, and the selected character can come from the first letter after the set of retained characters. This technique is illustrated in FIG. 10 where a method 250 includes a step 252 of selecting a word as a function of a set of retained characters. The word is presented to the user at step 254. An action is then received from the user pertaining to a character in the word following the set of retained characters at step 256. As with the method 200 described above, an indication such as a right button depression can be used to indicate that the character should be added to the set of retained characters, while an up button depression or a down button depression indicates that the desired characters precede or succeed the presented word, respectively. In other words, the successive selected word is chosen as a function of the set of retained characters and is bounded by the previously presented word.

If in the event of presenting words and receiving responses from the user with respect to the presented word for either of the methods 200 and 250, the computing device runs out of words to present, thereby indicating that the desired word of the user is between successive words of the lexicon 55, the computing device can then present characters to the user. For instance, suppose the user desires the word "cats", but the lexicon contains only the successive words of "catholic" and "cattle". In the example of FIG. 6, with "catholic" displayed, the user would depress the down button 38 to indicate that the desired character of "s" in "cats" follows the character "h" of "catholic". The computing device would then display the word "cattle" with the second "t", underlined. A user would then depress the up button 37 to indicate that the desired characters "s" precedes "t", but the computing device will know that it has already displayed "catholic". In such cases, the computing device can then display "cati", where the "i" is underlined indicating that this character has been selected from a range comprising "a" . . . "z". The computing device will then await the user's response to the selected character. In the example of the desired word comprising "cats", the user would then depress the down button 38, indicating that the desired character is in the range following "i", or "j" . . . "z". The computing device would then selected another character from the refined range, present it to the user and await a response. This iterative process will continue until the desired character is selected. Any word can thus be obtained by adding characters sequentially in this manner. If desired, the characters selected from any given range can be based on probability of the character following the set of retained characters. For instance, a N-gram model can be used to select characters based on the set of retained characters.

In a further embodiment, the computing device will allow the user to make a mistake when depressing the up button 37 or down button 38 in response to a presented character. For instance, suppose a user desires a character "h", but incorrectly presses the down button 38 in response to presentation of the character "i". Due to the incorrect depression of the down button 38, the computing device will refine the range of characters from "j" . . . "z", but will not display an "h" since this character is outside the range. However, eventually the computing device will display two successive characters within the range, for example a "j" followed by a "k", or a "k" followed by a "j". In either case, the user will respond to the last displayed character with depression of the up button 38. Since the computing device has displayed each of the characters "i", "j" and "k", in this example, the range of characters will be reset to "a" . . . "h", "i", or "j" (depending on the particular implementation employed). However, most importantly, the new range now includes the desired character of "h", thereby allowing the user to converge to the desired character.

As indicated above, generally, by pressing the up button 37 and the down button 38, a binary search is conducted over the characters that may occupy the space of the underline character in FIG. 7. In some applications, it may be helpful to minimize the depth of the binary tree. This can be accomplished by selecting the character within the given range that minimizes the average number of button depressions (iterations through method 200), weighted by the word probabilities stored in the lexicon 55. In one embodiment, this computation is done using a recursive algorithm. In particular, each character in a given range of characters (min, max) is considered. The character with the least average button depressions or iterations through method 200 is chosen. The average button depressions for a letter is the number of iterations to choose the letter times the probability of any word in a lexicon 55 that starts with the set of retained characters (set of retained characters) followed by the letter, plus the average iterations over the range (min, letter −1), plus the average iterations over the range (letter +1, max).

The following is pseudocode of the recursive algorithm that finds the best letter given some set of retained characters (prefix) in some range of letters. The algorithm calls a function GetCorpusCount, which counts the number of occurrences in the lexicon 55 of words starting with a particular set of retained characters.

```
' prefix is the starting letters of the word, possibly
empty
' All letters within [minLetter..maxLetter] are
considered
' clicks is the number of clicks that it's taken to
get to here
' Returns in bestLetter the letter within the range
that has the lowest factoring cost
' Function result is factoring cost for prefix &
bestLetter; zero if none
    Function BestFactoringCost( _
        ByVal prefix As String, _
        ByVal minLetter As String, _
        ByVal maxLetter As String, _
        Optional ByVal clicks As Long = 0, _
        Optional ByRef bestLetter As String) _
        As Long
    ' Assume that we won't find a candidate
    Dim bestCost As Long
    bestCost = 0
    bestLetter = minLetter
    ' Try each letter
    Dim letter As String
    For letter = minLetter To maxLetter
        ' Compute the cost for dividing at this letter
        Dim letterCost As Long
        letterCost = clicks * GetCorpusCount(prefix & letter) + _
            BestFactoringCost(minLetter,
            letter − 1, clicks + 1)
        + _
            BestFactoringCost(letter + 1,
maxLetter, clicks + 1)
        ' Remember this one if it's the best
        If bestCost > letterCost Then
            bestCost = letterCost
            bestLetter = letter
        End If
    Next letter
    BestFactoringCost = bestCost
    End Function
    Private Function GetCorpusCount(ByVal prefix As
String) As Long
    ' Count the number of occurrences in the
corpus of words starting with this prefix
        Dim count As Long
        count = 0
        Dim wordEntry As DictionaryWord
        For Each wordEntry In Dictionary
            If Left(wordEntry.word, Len(prefix)) =
prefix Then
                count = count + wordEntry.
Occurrences
            End If
        Next wordEntry
        GetCorpusCount = count
    End Function
```

As appreciated by those skilled in the art the combinatorics of the recursive algorithm can be prohibitive. In one embodiment, the analysis can be shortened by considering only the top few letters in terms of total word probability. Commonly, the best letter is in the top three selections.

In the examples provided above, the up button 37 and the down button 38 are considered to have equal weight. In a further embodiment, there may be a desire to have the user click on the same button again rather than switch directions. Accordingly, the range of characters in step 202 can be chosen to increase the likelihood of the same button being pressed again to refine the range. Although this may increase the number of iterations through method 200, the overall time for selecting characters of a desired word may be reduced. In the code provided above, this would entail modifying the function BestFactoringCost and retaining the key sequence history.

After selecting the letter at step 202, the word chosen as step 204 can be obtained by simply scanning the words that begin with the set of retained characters and the selected letter, and choosing the one with the highest probability.

Generally, the lexicon 55 comprises a dictionary having a list of words that can include associated probabilities. Alternately, the lexicon can be implemented by a 26-way branching tree. The root of the tree branches to subtrees that start with each of the 26 letters, e.g. the subtree for the "a" branch contains all the words that start with "a". The next layer in the tree branches out according to the second letter, and so on. Each word then is a node in the tree such that the node represents the last letter in the tree, and its parent represents the letter before that, and so on to the root. With each node, the words probability can be stored. Each node can also store the probability of the words in the subtree, and the most probable tree in the subtree, which can be helpful in simplifying selection of a letter at step 202 and a selection of the word at step 204.

Although the present invention has been described with reference to preferred embodiments, workers skilled in the art will recognize that changes may be made in form and detail without departing from the spirit and scope of the invention.

What is claimed is:

1. A method of providing selected text into a computer, the method comprising:
   select a word with the computer based on a set of at least one retained character;
   presenting the word to the user and identifying a character in the presented word, the presented word at least not initially being the word desired by the user; and
   receiving an input from the user into the computer pertaining to the character in the presented word, the input comprising a first input indicating that the character in the presented word is not correct and a correct character alphabetically precedes the character in the presented word, or a second input being different than the first input, wherein the second input indicates the character in the presented word is not correct and the correct character alphabetically succeeds the character in the presented word.

2. The method of claim 1, wherein receiving an input includes receiving an indication to retain the character in the presented word in the set of retained characters.

3. The method of claim 2, and further comprising:
   retaining the character in the presented word in the set of retained characters;
   identifying to the user a next character that immediately follows the character in the presented word; and
   receiving an action from the user pertaining to the next character.

4. The method of claim 1, and further comprising constructing a set of at least one retained character by:
   selecting a character with the computer in an alphabetical range of characters;
   selecting a word with the computer based on the computer-selected character, wherein the word is not the word desired by the user; and
   presenting the word based on the computer-selected character to the user.

5. The method of claim 4, wherein constructing a set of at least one retained characters further comprises receiving an action from the user indicating whether the user-desired character alphabetically precedes or succeeds the computer-selected character or whether the user-desired character matches the computer-selected character.

6. The method of claim 1, wherein selecting the word comprises selecting the word based on probability.

7. A method of providing selected text into a computer, the method comprising:
   selecting a character with the computer in an alphabetical range as a function of probability in the alphabetical range;
   selecting a word with the computer as a function of the selected character, the selected word having a character sequence, the word at least not initially being the word desired by the user;
   presenting the word to the user and identifying the computer selected character;
   receiving an indication from the user indicating whether a user-desired character is alphabetically preceding or succeeding the computer-selected character or whether the computer-selected character matches the user-desired character,
      wherein if receiving the indication comprises receiving an indication that the user-desired character matches the computer-selected character, then
         retaining the computer-selected character as one of a set of retained characters; and
         identifying to the user a next character of the character sequence, if any;
      wherein if receiving the indication comprises a first input indicating that the computer-selected character is not correct and a correct character alphabetically precedes the computer-selected character, then selecting a new word; and
      wherein if receiving the indication comprises a second input, the second input being different than the first input, indicating that the computer-selected character is not correct and the correct character alphabetically succeeds the computer-selected character, then selecting a new word.

8. The method of claim 7, wherein if receiving an indication includes receiving an indication that the computer-selected character is alphabetically preceding or succeeding the user-desired character, the method further comprises adjusting the range of characters so that the range of characters is bounded based on the computer-selected character.

9. The method of claim 7, wherein if receiving an indication comprises receiving an indication that the user-desired character matches the computer-selected character, the method further comprises receiving an indication from the user indicating whether a next user-desired character is alphabetically preceding or succeeding the next character or whether the user-desired next character matches the next character.

10. The method of claim 9, wherein if receiving an indication comprises receiving an indication that the next user-desired character matches the next character, the method further comprises repeating retaining the computer-selected character as one of the set of retained characters, and identifying to the user a next character of the character sequence, if any.

11. The method of claim 9, wherein if receiving an indication comprises receiving an indication that the next user-desired character is alphabetically preceding or succeeding the next character, the method further comprises adjusting the range of characters so that the range of characters is bounded based on the next character.

12. The method of claim 7, wherein the computer-selected word is selected based on probability.

13. The method of claim 7, wherein the word selected as a function of the retained set of characters is selected based on probability.

14. The method of claim 13, wherein the word is selected based on an n-gram model.

15. A computer-readable storage medium including computer-executable instructions comprising:
  selecting a character in an alphabetical range of characters as a function of probability in the alphabetical range;
  selecting a word based on the selected character, the word at least not initially being the word desired by the user;
  rendering the selected word and identifying the character to the user, the word having a character sequence;
  receiving an indication to retain the character;
  retaining the character in a set of retained characters;
  identifying to the user the next character in the character sequence of the selected word;
  receiving an indication to not retain the next character, wherein the indication comprises a first input or a second input, the second input being different than the first input, the first input indicating that a correct next character alphabetically precedes the next character, and wherein the second input indicates that the correct next character alphabetically precedes the character; and
  re-selecting a word based on the set of retained characters.

16. The computer-readable storage medium of claim 15, wherein re-selecting a word is based on probability.

17. The computer-readable storage medium of claim 16, and further comprising adjusting a range of characters so that the range is bounded based on the next character.

18. The computer-readable storage medium of claim 17, and further comprising:
  selecting a character in the adjusted range of characters; and
  selecting word based on the character in the adjusted range of characters.

* * * * *